Jan. 6, 1948.  C. J. HARASTA  2,434,109
AIRCRAFT GUN SIGHT HAVING ADJUSTABLE TRANSPARENT REFLECTOR MEANS
Filed Aug. 12, 1944  2 Sheets-Sheet 1
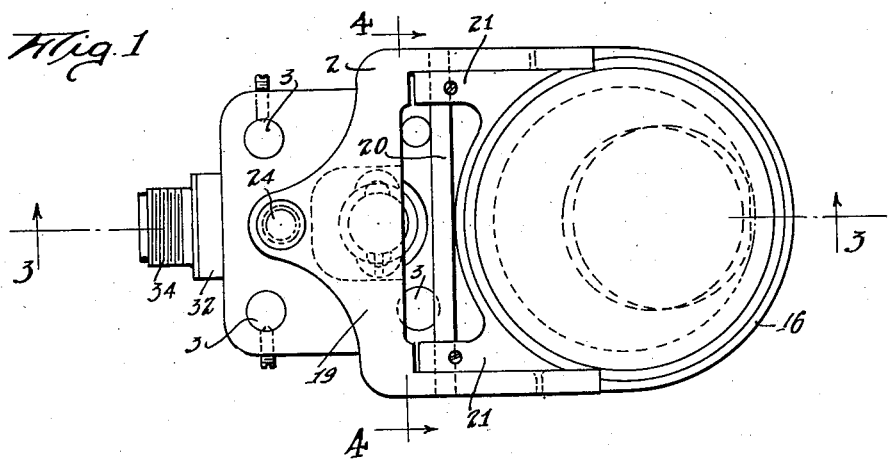
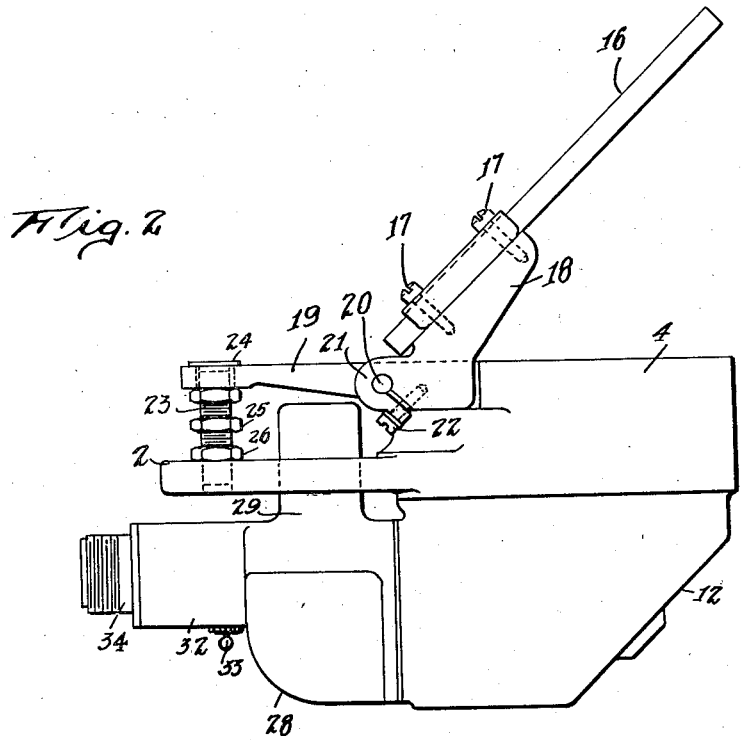
Inventor
Clarence J. Harasta

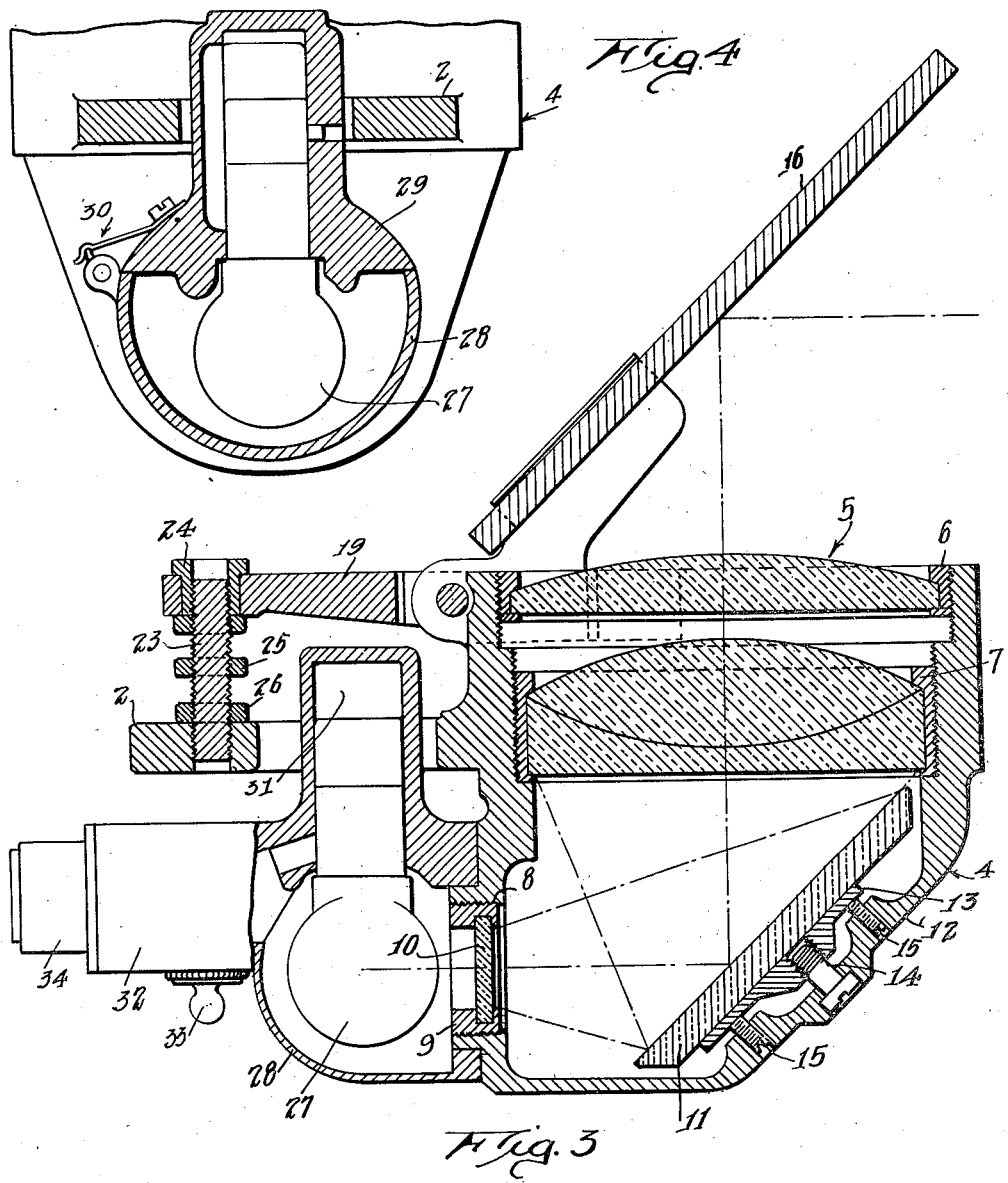

UNITED STATES PATENT OFFICE 2,434,109

AIRCRAFT GUN SIGHT HAVING ADJUSTABLE TRANSPARENT REFLECTOR MEANS

Clarence J. Harasta, Los Angeles, Calif., assignor of twenty-five per cent to Robert M. Lynn, twenty-five per cent to Julia M. Lynn, and twenty-five per cent to Mildred A. Harasta Application August 12, 1944, Serial No. 549,155

1 Claim. (Cl. 88—2.4)

This invention relates to a gun sight of the type fixed to an aircraft for sighting guns which are also fixed to the aircraft.

A gun sight for use upon aircraft consists essentially of means for illuminating a reticle, means for focusing an image of said reticle at a considerable distance, and a transparent reflector or dividing plate positioned so as to reflect the image of the reticle to the operator while the operator is observing the target through the plate. For sighting purposes it is desirable to present a fairly large image of the reticle to the vision of the operator. Because of the space requirements in aircraft design, it is desirable that these gun sights be constructed as compactly as possible. Another important prerequisite of the gun sights is that they be formed so as to present a minimum of the type of surfaces which might cause injury to the operator on contact therewith.

The gun sights designed for aircraft previous to the present invention have either had the disadvantage of being unsatisfactory because of their bulk or have placed severe requirements on the lens systems to be employed in the gun sights, because of the very short focal length and large aperture ratio necessary in a compact instrument.

It is the general object of the present invention to provide a gun sight characterized by the fact that the focal length of the lens system of the gun sight may be substantially increased without a corresponding increase in the overall size or bulk of the instrument.

Another object of the present invention is to so construct the gun sight as to present a minimum of objectionable projections hazardous to the operator.

These objects are accomplished in the gun sight of the present invention by including a mirror in the lens housing and disposing the reticle and lamp for illuminating the reticle at an angle relative to the axis of the lens system. In this manner the length of the apparatus is shortened and the bulk of the apparatus not substantially increased since the lamp and reticle mounting housing are disposed underneath the mounting fixtures of the sight.

Means are provided for suspending the lamp in a vertical position and the socket for the lamp is arranged to fit within the recesses or openings provided in the mounting plate of the sight and therefore are buried from possible contact by the operator.

By these improvements in gun sights, I have provided an instrument which permits the use of the lens system having an increased focal length without either substantially increasing the bulk of the instrument or presenting hazardous projections to the operator. The gun sight of the present invention will be more fully understood from a description of the preferred form or example of the invention, and for that purpose the preferred example of the invention is described in connection with the accompanying drawings in which:

Fig. 1 is a plan view;

Fig. 2 is a side elevation;

Fig. 3 is an enlarged vertical section taken on the line 3—3 of Fig. 1; and

Fig. 4 is a fragmentary section substantially on the line 4—4 of Fig. 1.

Referring to the drawings, the instrument of the present invention comprises a mounting plate or member 2 provided with a suitable opening 3 by means of which the instrument may be supported on the aircraft. The mounting member 2 extends laterally from a lens housing 4 which contains a lens system somewhat diagrammatically indicated at 5, the different lenses of the system being supported by rings 6 and 7 for adjustment of their relative positions in the housing 4. The housing 4 is provided with a lateral opening 8 into which is threaded a ring 9 supporting the reticle 10, an image of which is to be focused by the lens system at a remote point from the sight, usually a number of thousand feet in advance of the aircraft. The reticle 10 is mounted at right angles to the axis of the lens system 5 and a reflector 11 is mounted within the base of the housing 4 on a sloping wall 12 thereof. The reflector 11 should be accurately disposed at a 45° angle with respect to the axis of the lens system and for adjusting the position of the reflector 11 it is mounted upon a plate 13 outwardly from the slanting wall 12 of the housing by pins 14 and contacting adjusting screws 15, three or more of which are preferably provided at equally spaced circumferential positions.

A transparent plate 16 mounted at a 45° angle is provided over the top of the lens system and serves the double purpose of permitting the operator to observe the intended target through the plate 16 while viewing the image as reflected by the plate to him. The transparent plate or reflector 16 is mounted by screws 17 on an extension 18 of an arm 19. The arm 19 is mounted for adjustment on a rod 20 supported by ears 21 extending from the housing 4. For assisting in stabilizing the position of the reflector 16 lock-screws 22 are indicated.

For accurate adjustment of the angle of the reflector 16 there is provided an adjusting means including the threaded member 23 screw-threaded into the mounting plate 2 at its lower end and at its upper end threaded within a sleeve 24 in an opening in the arm 19. Nuts 25 and 26 are provided and two different pitch threads may be included in the adjusting means in order to secure a very fine or micrometer adjustment of the position of the reflector 16.

For illuminating the reticle 10 there is provided an incandescent lamp 27 suspended in a vertical position at one side of the lens housing 4. This lamp 27 is enclosed within a lamp housing 28 attached to the housing 4 in any suitable manner, not shown. The lamp housing 28 is pivoted to a lamp socket 29, as indicated at 30, and said lamp socket extends upwardly through an aperture 31 in the mounting plate, designed to permit the socket to be hidden under the arm 19 and within the mounting plate 2 from any accidental contact therewith by the operator. The housing 28 is provided with an extension 32 forming a housing for a switch 33 and outlets 34 for lead cables to the lamp 27.

The gun sight of the present invention achieves substantial increase in the focal length permissible for the lens system through the expediency of mounting the reticle at right angles to the axis of the lens system so as to permit the lamp (for illuminating the reticle) to be exposed exteriorly of the housing of the lens system and with this arrangement and construction of the parts a very satisfactory and compact gun sight is provided.

While the particular form of the device herein described is well adapted to carry out the objects of the present invention, it is to be understood that various modifications and changes may be made, and this invention is of the scope set forth in the appended claim.

I claim:

A gun sight for an aircraft, comprising a holder for a lens system, said lens system having a vertical axis, a supporting plate attached to said holder and having an aperture, an arm pivoted to said holder and supporting a transparent reflector plate over said lens system, said arm having a portion extending above and spaced from said mounting plate, adjusting means engaging said mounting plate and said extension in said arm for adjusting the angular position of said arm, a lamp housing including a lamp-holding socket positioned for mounting the lamp suspended from said socket, said socket extending through the aperture in said mounting plate, an aperture in said lamp housing registering with an aperture in said holder, a reticle mounted within said latter aperture, and a reflector plate for reflecting light from said reticle to said lens system.

CLARENCE J. HARASTA.

REFERENCES CITED

The following references are of record in the file of this patent:

UNITED STATES PATENTS

| Number | Name | Date |
| --- | --- | --- |
| 2,367,207 | Flint | Jan. 16, 1945 |
| 2,379,167 | Lynn | June 26, 1945 |
| 2,377,797 | MacGill | June 5, 1945 |
| 2,354,720 | Wagner | Aug. 1, 1944 |
| 2,284,150 | Kemna | May 26, 1942 |